US012659030B2

(12) United States Patent
Xu et al.

(10) Patent No.: US 12,659,030 B2
(45) Date of Patent: Jun. 16, 2026

(54) MONITORING METHOD, CONTROL MODULE AND COMPUTER MEDIUM OF DISTRIBUTED ANTENNA SYSTEM

(71) Applicants: PROSE TECHNOLOGIES (SUZHOU) CO., LTD., Suzhou (CN); PROSE TECHNOLOGIES LLC, Mount Olive, NJ (US)

(72) Inventors: Renzhen Xu, Suzhou (CN); Botao Zhu, Suzhou (CN); Xiuping Wang, Suzhou (CN); Cunxiao Fan, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 415 days.

(21) Appl. No.: 18/306,997

(22) Filed: Apr. 25, 2023

(65) Prior Publication Data

US 2023/0336245 A1     Oct. 19, 2023

Related U.S. Application Data

(63) Continuation of application No. PCT/CN2022/076749, filed on Feb. 18, 2022.

(30) Foreign Application Priority Data

Nov. 23, 2021     (CN) .......................... 202111396385.4

(51) Int. Cl.
| | |
|---|---|
| *H04B 10/07* | (2013.01) |
| *H04B 10/079* | (2013.01) |
| *H04B 10/25* | (2013.01) |

(52) U.S. Cl.
CPC ......... *H04B 10/0795* (2013.01); *H04B 10/25* (2013.01)

(58) Field of Classification Search
CPC ............... H04B 10/0795; H04B 10/25; H04B 10/25753; H04B 10/0773; H04B 10/07
See application file for complete search history.

(56) References Cited

U.S. PATENT DOCUMENTS

| | | | | |
|---|---|---|---|---|
| 9,369,434 B2 * | 6/2016 | Kim | .................... | H04L 63/0227 |
| 10,615,868 B2 * | 4/2020 | Oda | .................... | H04J 14/0201 |

(Continued)

FOREIGN PATENT DOCUMENTS

| | | | | | |
|---|---|---|---|---|---|
| BR | PI0401601 | A | * 12/2005 | ......... | H04Q 11/0062 |
| CN | 101267359 | A | * 9/2008 | | |

(Continued)

OTHER PUBLICATIONS

The European Patent Office (EPO) The Extended European Search Report for 22896971.3 Oct. 27, 2025 9 Pages.

*Primary Examiner* — Tanya T Motsinger
(74) *Attorney, Agent, or Firm* — Anova Law Group, PLLC

(57) ABSTRACT

A method for monitoring a distributed antenna system includes: at a relay device, receiving a first operation monitoring signal sent by the near-end device, where the first operation monitoring signal carries an operation monitoring message, and the operation monitoring message includes a device address of a monitoring target device; determining whether to analyze the first operation monitoring signal according to a connection status with the near-end device; in response to a determination to analyze the first operation monitoring message signal, analyzing the first operation monitoring signal to confirm the monitoring target device and to determine whether to respond to the operation monitoring message; and in response to a determination to (Continued)

respond to the operation monitoring message, responding to the operation monitoring message according to the monitoring target device as confirmed.

16 Claims, 9 Drawing Sheets

(56)                    References Cited

U.S. PATENT DOCUMENTS

| | | | | |
|---|---|---|---|---|
| 10,958,445 | B1* | 3/2021 | Auch ..................... | H04W 12/03 |
| 2009/0161600 | A1* | 6/2009 | Sato ...................... | H04W 28/06 |
| | | | | 370/328 |
| 2011/0273309 | A1* | 11/2011 | Zhang .................. | A61B 5/0013 |
| | | | | 340/870.07 |
| 2016/0285552 | A1* | 9/2016 | You ......................... | H04B 10/29 |
| 2018/0152244 | A1* | 5/2018 | Cho ................. | H04B 10/25753 |
| 2020/0213880 | A1* | 7/2020 | de Goycoechea ..... | H04B 17/16 |

| | | | | |
|---|---|---|---|---|
| 2021/0211192 | A1* | 7/2021 | Funada ................... | H04L 69/40 |
| 2021/0226867 | A1* | 7/2021 | Ovadia ............... | H04L 12/2856 |
| 2023/0087839 | A1* | 3/2023 | Yokokura .......... | H04B 10/0793 |
| | | | | 398/25 |
| 2024/0031021 | A1* | 1/2024 | Xu ........................ | H04B 10/073 |
| 2026/0019292 | A1* | 1/2026 | Mishelevich ....... | H04L 12/2807 |

FOREIGN PATENT DOCUMENTS

| | | | |
|---|---|---|---|
| CN | 101340238 | A | 1/2009 |
| CN | 202085309 | U | 12/2011 |
| CN | 102769495 | A | 11/2012 |
| CN | 103384385 | A | 11/2013 |
| CN | 104579459 | A | 4/2015 |
| CN | 106792796 | A | 5/2017 |
| CN | 108601046 | A | 9/2018 |
| CN | 111641723 | A | 9/2020 |
| CN | 113992245 | A | 1/2022 |
| WO | 2021213239 | A1 | 10/2021 |

* cited by examiner

500

502 receiving first operation monitoring signal sent by the near-end device through the first optical port

504 whether to analyze the first operation monitoring signal?

yes

506 determining the monitoring target device and determining whether to respond?

yes

508 responding to the operation monitoring message according to the monitoring target device as determined

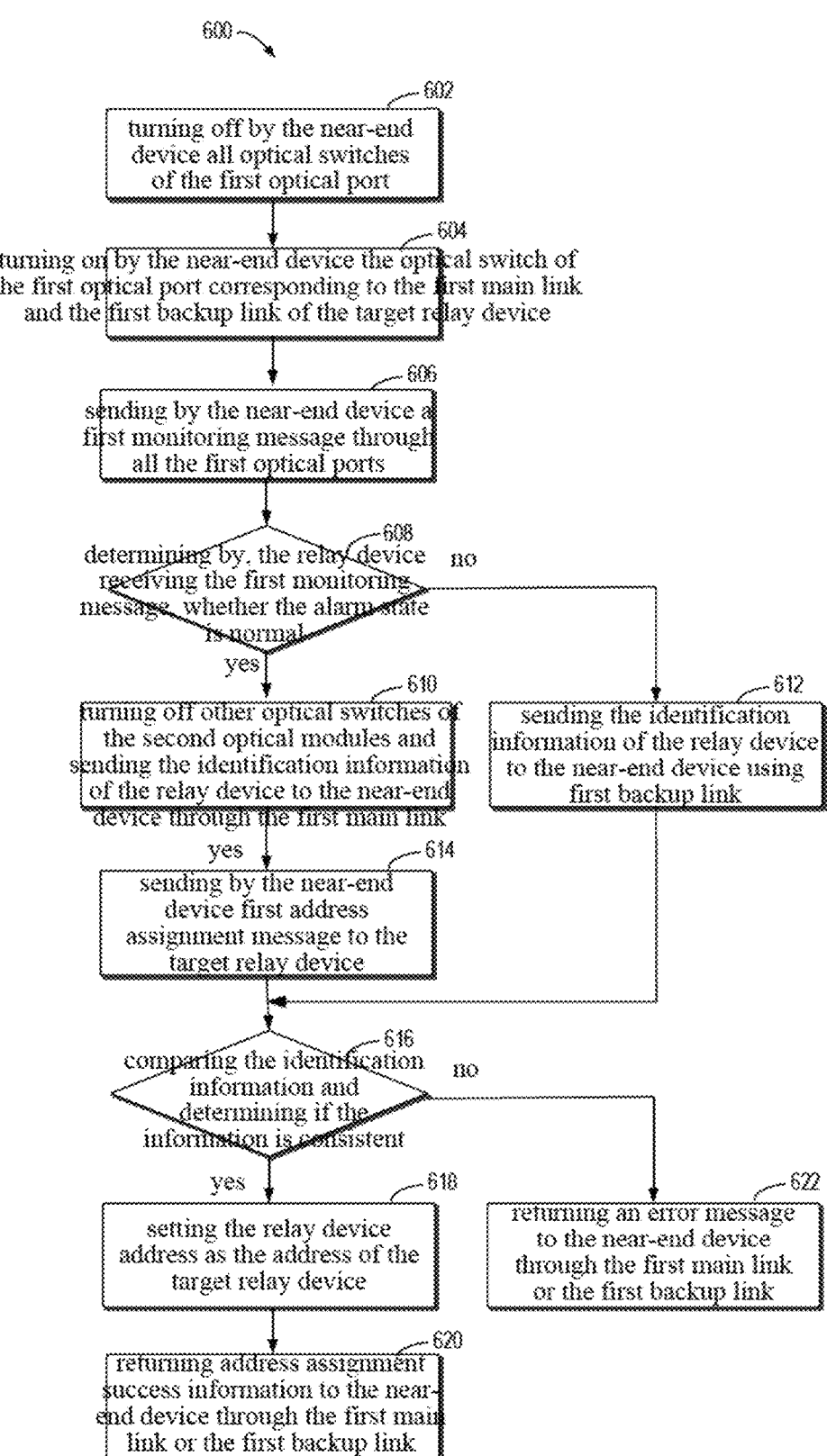

600

602
turning off by the near-end
device all optical switches
of the first optical port 604
turning on by the near-end device the optical switch of
the first optical port corresponding to the first main link
and the first backup link of the target relay device 606
sending by the near-end device a
first monitoring message through
all the first optical ports 608
determining by the relay device
receiving the first monitoring
message, whether the alarm state
is normal                     no yes 610
turning off other optical switches of
the second optical modules and
sending the identification information
of the relay device to the near-end
device through the first main link 612
sending the identification
information of the relay device
to the near-end device using
first backup link yes 614
sending by the near-end
device first address
assignment message to the
target relay device 616
comparing the identification
information and
determining if the
information is consistent          no yes 618
setting the relay device
address as the address of the
target relay device 622
returning an error message
to the near-end device
through the first main link
or the first backup link 620
returning address assignment
success information to the near-
end device through the first main
link or the first backup link

FIG. 6

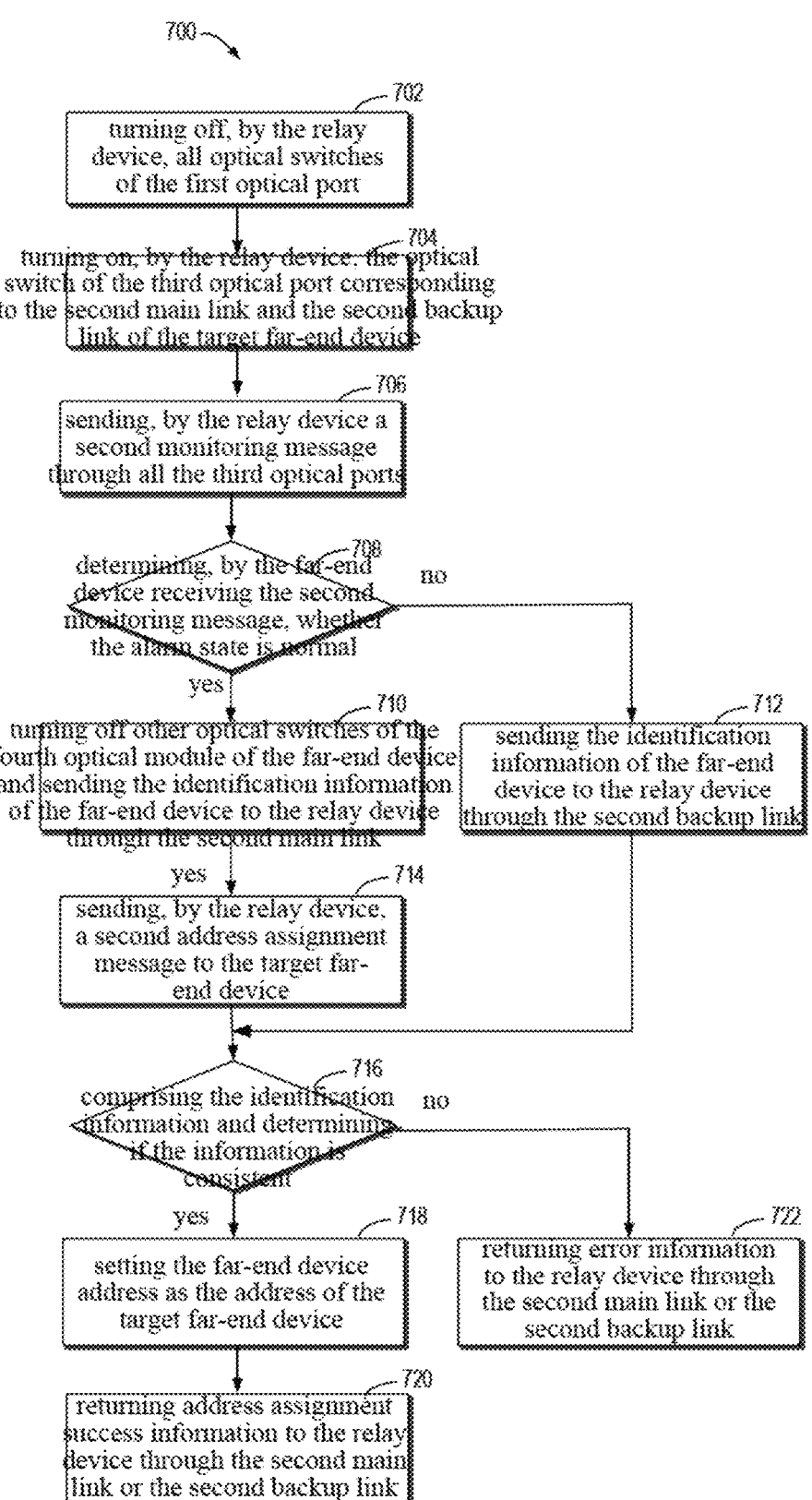

700

702
turning off, by the relay device, all optical switches of the first optical port 704
turning on, by the relay device, the optical switch of the third optical port corresponding to the second main link and the second backup link of the target far-end device 706
sending, by the relay device a second monitoring message through all the third optical ports 708
determining, by the far-end device receiving the second monitoring message, whether the alarm state is normal — no yes 710
turning off other optical switches of the fourth optical module of the far-end device and sending the identification information of the far-end device to the relay device through the second main link 712
sending the identification information of the far-end device to the relay device through the second backup link yes 714
sending, by the relay device, a second address assignment message to the target far-end device 716
comprising the identification information and determining if the information is consistent — no yes 718
setting the far-end device address as the address of the target far-end device 722
returning error information to the relay device through the second main link or the second backup link 720
returning address assignment success information to the relay device through the second main link or the second backup link

FIG. 7

MONITORING METHOD, CONTROL MODULE AND COMPUTER MEDIUM OF DISTRIBUTED ANTENNA SYSTEM

RELATED APPLICATIONS

This application is a continuation application of PCT Patent Application No. PCT/CN2022/076749, filed on Feb. 18, 2022, which claims priority to Chinese Patent Application No. 202111396385.4 filed with the National Intellectual Property Administration, People's Republic of China on Nov. 23, 2021, all of which are incorporated herein by reference in entirety.

FIELD OF THE TECHNOLOGY

The present disclosure generally relates to the field of communication, and more specifically, relates to a monitoring method, a control module, and a computer-readable storage medium, in relation to a distributed antenna system.

BACKGROUND

In many scenarios, such as in buildings, tunnels, large public places, stadiums and the like, the base station may not provide a large enough signal coverage, or the user density exceeds the range that the base station may usually handle. In these scenarios, the base station's signal coverage for these areas may be expanded or enhanced by installing a Distributed Antenna System (DAS). In particular, with the popularization of the fifth-generation mobile communication technology (5G), the millimeter wave (mmWave) of 5G has low penetration in space transmission and is susceptible to interference, so the demand for the deployment of distributed antenna systems has further been increased.

A distributed antenna system usually includes multiple space-separated antenna nodes or components, which transmit the signal from a signal source to a far-end end step by step through various signal transmission media. FIG. 1 shows a schematic structural diagram of a distributed antenna system 100. As shown in FIG. 1, the distributed antenna system 100 has a multi-level architecture, which may include a near-end device 10 and multiple relay devices 20 (shown schematically as relay devices 20-1, 20-2, . . . 20-*m*, wherein m is an integer greater than 1) and a plurality of far-end devices 30 (shown schematically as far-end devices 30-1, 30-2, . . . 30-*n* in FIG. 1, where n is an integer greater than 1, and n is greater than or equal to m). The far-end device 10 may acquire a radio frequency signal from a signal source such as a base station, and transmit the acquired radio frequency signal to the far-end device 30 through the relay device 20. The far-end device 30 is at a place where signal coverage needs to be expanded or enhanced, to directly communicate with the user's mobile terminal.

The far-end device 10 may be connected to the relay device 20 through an optical fiber, and the relay device 20 may be connected to the far-end device 30 through an optical fiber. Therefore, fiber damage will cause communication interruption and abnormal radio frequency signals. Since the far-end device 10, the relay device 20, and the far-end device 30 are usually located at different physical locations or difficult-to-reach locations, it is very difficult and time-consuming to manually detect the entire optical fiber link, and it is impossible to pinpoint and correct connection errors when there is a connection error in the optical fiber.

SUMMARY

In order to solve the problem that the distributed antenna system is difficult to monitor, the present disclosure provides a kind of monitoring method for a distributed antenna, where a lower-level device may analyze and respond to an operation monitoring message according to the connection state of the optical fiber, so that an upper-level device may automatically obtain the operation information of the lower-level device.

According to one aspect of the present disclosure, a method for monitoring a distributed antenna system is provided. The distributed antenna system includes a near-end device, one or more relay devices connected to the near-end device, and one or more far-end devices connected to each relay device. The monitoring method includes: at a relay device, receiving a first operation monitoring signal sent by the near-end device through all first optical ports of the near-end device, where the first operation monitoring signal carries an operation monitoring message, and the operation monitoring message includes a device address of a monitoring target device; determining, by each second optical module of the relay device, whether to analyze the first operation monitoring signal according to a connection status with the near-end device; in response to a determination by the second optical module of the relay device to analyze the first operation monitoring message signal, analyzing the first operation monitoring signal to confirm the monitoring target device and to determine whether to respond to the operation monitoring message; and in response to a determination by the second optical module of the relay device to respond to the operation monitoring message, responding to the operation monitoring message according to the monitoring target device as confirmed.

According to another aspect of the present disclosure, a control module is provided, including: at least one processor; and at least one memory, the at least one memory is coupled to the at least one processor and storing instructions to be executed by the at least one processor, where the instructions, when executed by the at least one processor, cause the control module to perform the steps of the method as described above.

According to yet another aspect of the present disclosure, there is provided a non-transitory computer-readable storage medium on which computer program code is stored, and the computer program code executes the method as described above when executed by a processor.

Utilizing the disclosed solution, the lower-level device may analyze and respond to the operation monitoring message according to the connection state of the optical fiber, so that the upper-level device may automatically obtain the operation information of the lower-level device. In addition, in certain implementations, it is also possible to automatically switch from a main link to a backup link according to the connection status of the optical fiber to ensure the transmission of monitoring information. In addition, and in certain implementations, address assignment may be performed automatically every time the network topology changes, so that the link status of the entire system may be monitored in real time.

BRIEF DESCRIPTION OF THE DRAWINGS

Through a description of specific embodiments of the present disclosure in view of the following drawings, the present disclosure will be better understood, and other objects, details, features and advantages of the present disclosure will become more apparent.

FIG. 6 shows a flowchart of an address assignment method for a distributed antenna system according to certain embodiments of the present disclosure.

FIG. 7 shows a flowchart of an address assignment method for a distributed antenna system according to certain embodiments of the present disclosure.

DETAILED DESCRIPTION

Figure 1:
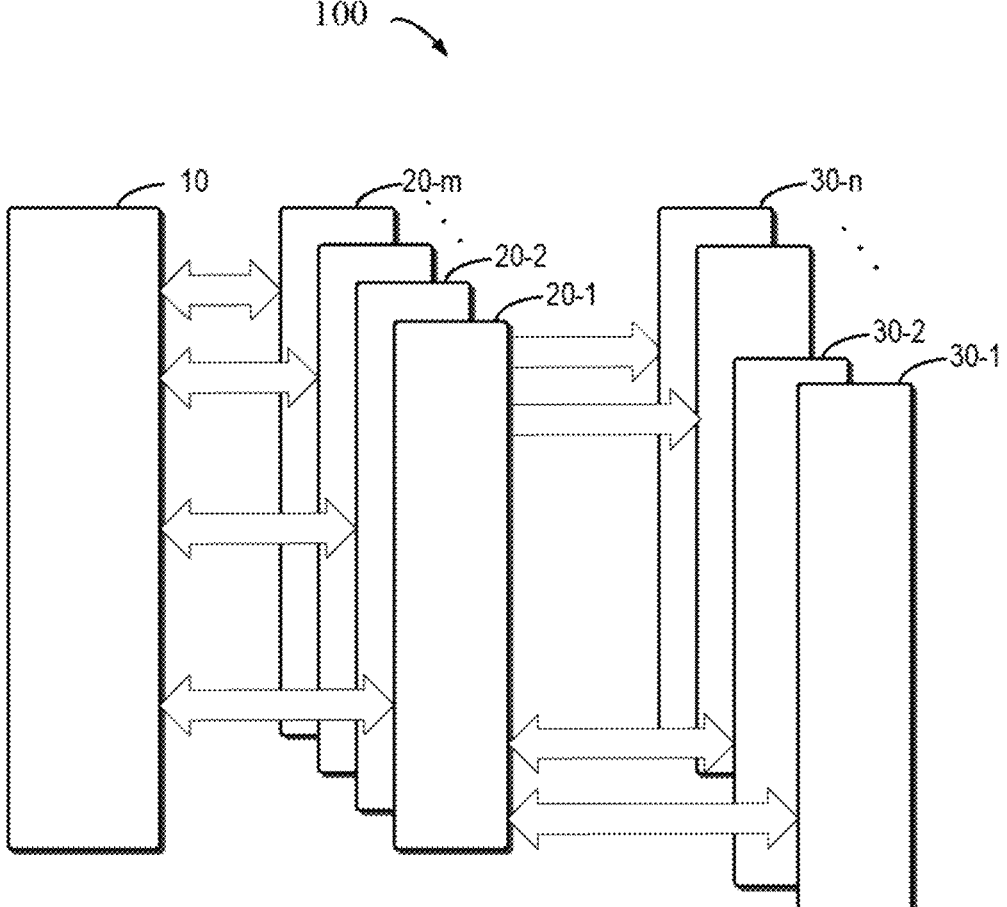
FIG. 1 shows a schematic structural diagram of a distributed antenna system.

Certain embodiments of the present disclosure will be described in more detail below with reference to the accompanying drawings. Although certain embodiments of the present disclosure are shown in the drawings, it should be understood that the present disclosure may be embodied in various forms and should not be limited to the embodiments set forth herein. Rather, these embodiments are provided so that the present disclosure will be thorough and complete, and will fully convey the scope of the present disclosure to those skilled in the art.

The term "comprising" and its variants used in the present disclosure represent an open inclusion, for example, "including but not limited to." The term "or" means "and/or" unless otherwise stated. The term "based on" means "based at least in part on." The terms "one embodiment" and "certain embodiments" mean "at least one example embodiment." The term "another embodiment" means "at least one further embodiment." The terms "first", "second", and the like may refer to different or the same object.

As shown in FIG. 1, the distributed antenna system 100 may include one near-end device 10, multiple relay devices 20, and multiple far-end devices 30. The near-end device 10 may include a first number of first optical modules 110, and each first optical module 110 has a second number of first optical ports 120. For example, four first optical modules 110-A, 110-B, 110-C, and 110-D are exemplarily shown in FIGS. 2 to 4 for the near-end device 10, and for each first optical module 110 eight first optical ports 120 are exemplarily shown, that is, the first optical module 110-A includes eight first optical ports 120-1 to 120-8, and the first optical module 110-B includes eight first optical ports 120-9 to 120-16, the first optical module 110-C includes 8 first optical ports 120-17 to 120-24, and the first optical module 110-D includes 8 first optical ports 120-25 to 120-32.

In addition, each relay device 20 may include a third number of second optical modules 210, and each second optical module 210 has a second optical port 220. A first optical port 120 of each first optical module 110 of the near-end device 10 may be connected to the second optical port 220 of a second optical module 210 of the relay device 20 through an optical fiber. For example, FIG. 2 and FIG. 4 exemplarily show four second optical modules 210-A, 210-B, 210-C, and 210-D for the relay device 20, and for each second optical module 210, one second optical port 220 is exemplarily shown, that is, the second optical port 220-A of the second optical module 210-A, the second optical port 220-B of the second optical module 210-B, the second optical port 220-C of the second optical module 210-C, and the second optical port 220-D of the second optical module 210-D; FIG. 3 exemplarily shows two second optical modules 210-A and 210-B for the relay device 20, and one second optical port 220 is exemplarily shown for each second optical module 210, that is, the second optical port 220-A of the second optical module 210-A, and the second optical port 220-B of the module 210-B. In this scenario, a connection between the first optical port 120 of the near-end device 10 and the second optical port 220 of the relay device 20 may also be directly described as a connection between the first optical port 120 of the near-end device 10 and the second optical module 210 of the relay device 20.

In addition, each relay device 20 may also include a fourth number of third optical modules 230, and each third optical module 230 has a fifth number of third optical ports 240. For example, four third optical modules 230-K, 230-L, 230-M and 230-N are exemplarily shown for the relay device 20 in FIG. 2 to FIG. 4, and for each third optical module 230 eight third optical ports 240 are exemplarily shown, that is, the third optical module 230-K includes eight third optical ports 240-1 to 240-8, and the third optical module 230-L includes eight third optical ports 240-9 to 240-16, the third optical module 230-M includes 8 third optical ports 240-17 to 240-24, and the third optical module 230-N includes 8 third optical ports 240-25 to 240-32. Each second optical module 210 of the relay device 20 may be connected to a third optical module 230 in various ways, to input the output signal of the second optical module 210 to the third optical module 230, which will not be elaborated herein.

Each far-end device 30 may include a sixth number of fourth optical modules 310, and each fourth optical module 310 may have a fourth optical port 320. A third optical port 240 of a third optical module 230 of each relay device 20 may be connected to a fourth optical port 320 of a fourth optical module 310 of a far-end device 30 through an optical fiber. For example, four fourth optical modules 310-K, 310-L, 310-M, and 310-N are exemplarily shown for each far-end device 30 in FIG. 2 to FIG. 4, and one fourth optical port 320 is exemplarily shown for each fourth optical module 310, that is, the fourth optical port 320-K of the fourth optical module 310-K, the fourth optical port 320-L of the fourth optical module 310-L, the fourth The fourth optical port 320-M of the four optical module 310-M, and the fourth optical port 320-N of the fourth optical module 310-N. In this scenario, in the following description, the connection between the third optical port 240 of the relay device 20 and the fourth optical port 320 of the far-end device 30 may also be directly described as the connection between the third optical port 240 of the relay device 20 and the fourth optical module 310 of the far-end device 30.

Depending on the number of first optical modules included in the near-end device 10, the number of first optical ports included in each first optical module, the number of second optical modules and the number of third optical modules included in the relay device 20, the number of third optical ports included in each third optical module, and the number of fourth optical modules included in each far-end device 30 and the like, the distributed antenna system 100 may have various structures.

In addition, the distributed antenna system 100 may work in multiple working modes. In different working modes, different corresponding relationships (that is, connection relationships) are pre-configured for the first optical port of the first optical module of the near-end device 10 and the second optical port of the second optical module of the relay device 20. In addition, in different working modes, different corresponding relationships (that is, connection relationships) are pre-configured for the third optical port of the third optical module of the relay device 20 and the fourth optical port of the fourth optical module of the far-end device 30. In the present disclosure, the corresponding optical ports of the upper and lower devices are connected in a one-to-one manner through optical fibers.

Figure 2:
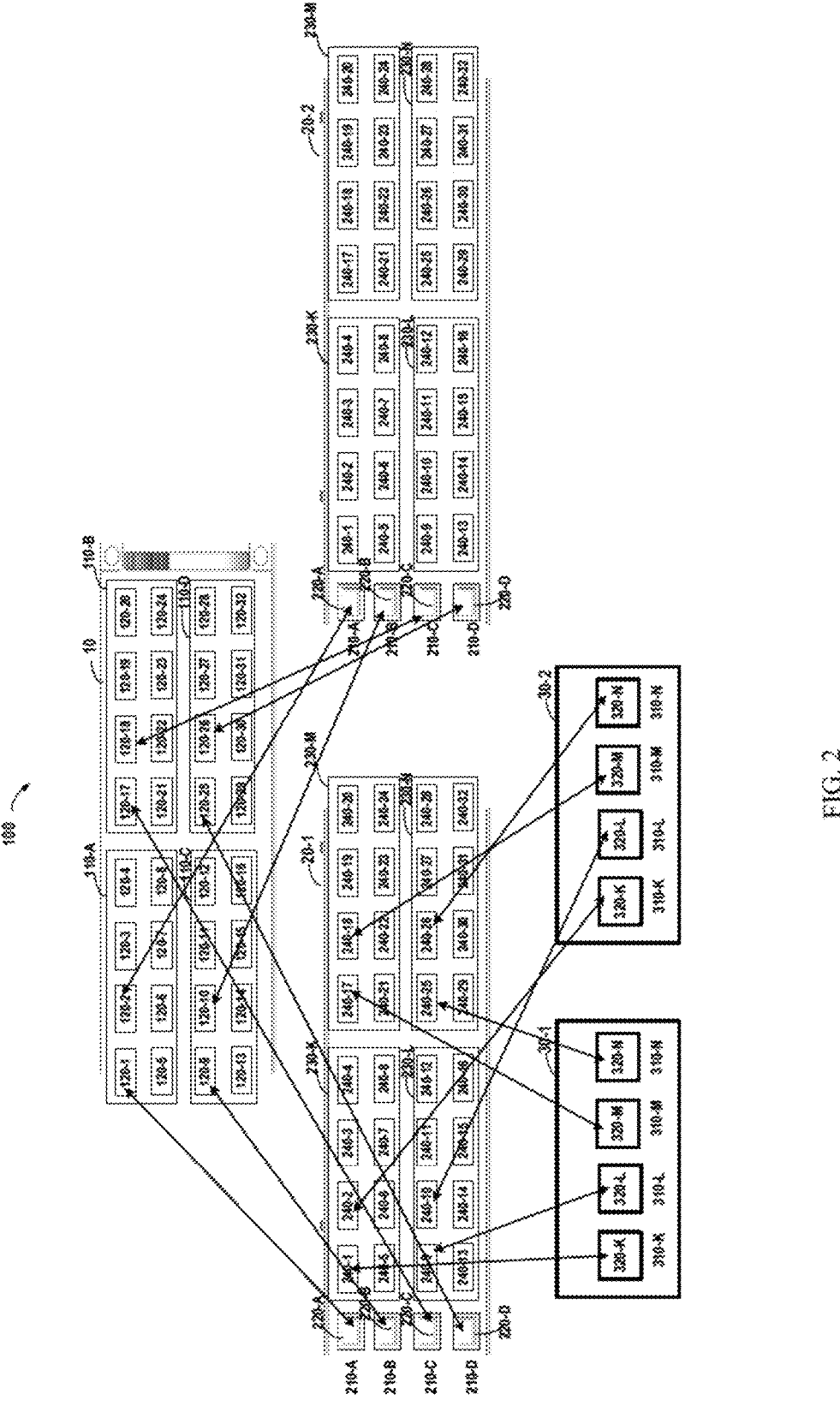
FIG. 2 shows a schematic diagram of the structure and connection relationship of a distributed antenna system in a working mode according to certain embodiments of the present disclosure.
Figure 3:
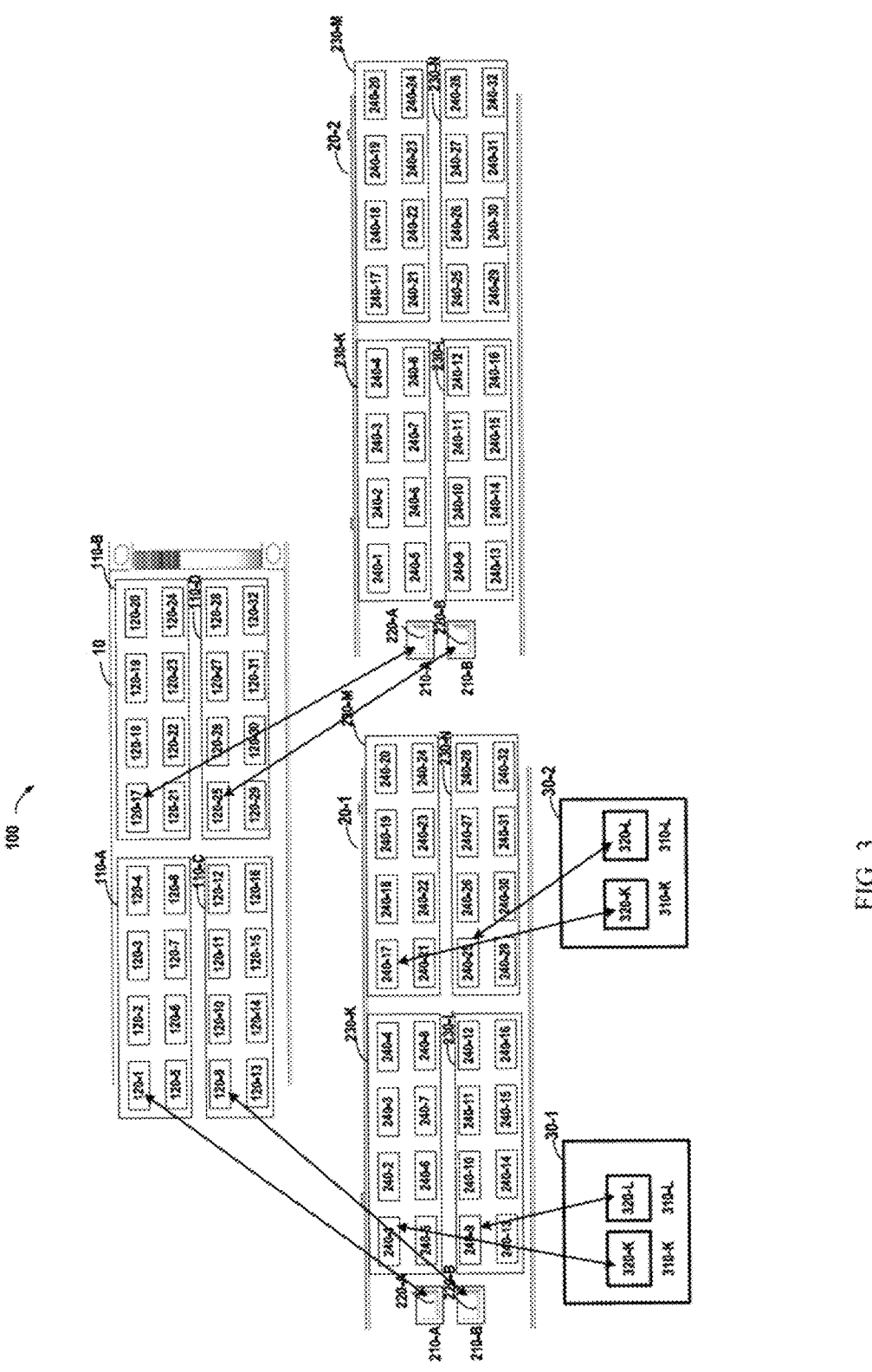
FIG. 3 shows a schematic diagram of the structure and connection relationship of a distributed antenna system in another working mode according to certain embodiments of the present disclosure.

FIG. 2 shows a schematic diagram of the structure and connection relationship of the distributed antenna system 100 in a working mode according to certain embodiments of the present disclosure. The working mode shown in FIG. 2 is 4T4R (that is, 4 transmissions and 4 receptions) mode, that is, the upper and lower-level devices of the distributed antenna system 100 are respectively connected by 4 optical fibers to form 4 physical optical fiber links.

As shown in FIG. 2, suppose the connection relationship between the first optical port 120 of the first optical module 110 of the near-end device 10 and the second optical port 220 of the second optical module 210 of the relay device 20 (for example, the relay device 20-1) is shown in Table 1 below.

TABLE 1

| first optical port 120 | second optical port 220 of the relay device 20-1 |
| --- | --- |
| 120-1 | 220-A |
| 120-9 | 220-B |
| 120-17 | 220-C |
| 120-25 | 220-D |

That is to say, each first optical module 110 of the near-end device 10 has a first optical port 120 connected to a second optical port 220 of a relay device 20-1.

In addition, for example, the connection relationship between the first optical port 120 of the first optical module 110 of the near-end device 10 and the second optical port 220 of the second optical module 210 of another relay device 20 (for example, the relay device 20-2) may be shown in Table 2 below.

TABLE 2

| first optical port 120 | second optical port 220 of the relay device 20-2 |
| --- | --- |
| 120-2 | 220-A |
| 120-10 | 220-B |
| 120-18 | 220-C |
| 120-26 | 220-D |

In this scenario, the number of relay devices 20 that may be connected to the near-end device 10 of the distributed antenna system 100 is equal to the number of first optical ports 120 included in the first optical module 110. For example, in the scenario where the first optical module 110 employs 1*8 first optical ports 120 (that is, each first optical module 110 includes 8 first optical ports 120), the near-end device 10 may be connected with up to 8 relay devices 20.

Similarly, as shown in FIG. 2, for each relay device 20 (for example, the relay device 20-1), the connection relationship between the third optical module 230 (for example, the third optical module 230-K) of the relay device 20 and the fourth optical port 320 of the fourth optical module 310 of the far-end device 30 (for example, the far-end device 30-1) may be shown in Table 3 below.

TABLE 3

| third optical port 240 of the third optical module 230 of the relay device 20-1 | fourth optical port 320 of the far-end device 30-1 |
| --- | --- |
| 240-1 | 320-K |
| 240-9 | 320-L |
| 240-17 | 320-M |
| 240-25 | 320-N |

That is to say, each third optical module 230 of the relay device 20-1 has a third optical port 240 connected to a fourth optical port 320 of a far-end device 30-1. Therefore, in this scenario, the maximum number of far-end devices 30 that may be connected to each relay device 20 is equal to the number of third optical ports 240 in each third optical module 230.

In addition, for example, the connection relationship between the third optical port 240 of the third optical module 230 of the relay device 20-1 and the fourth optical port 320 of the fourth optical module 310 of another far-end device 30 (for example, the far-end device 30-2) may be shown in Table 4 below.

TABLE 4

| third optical port 240 of the third optical module 230 of the relay device 20-1 | fourth optical port 320 of the far-end device 30-2 |
| --- | --- |
| 240-2 | 320-K |
| 240-10 | 320-L |
| 240-18 | 320-M |
| 240-26 | 320-N |

In this scenario, the number of far-end devices 30 that may be connected to each relay device 20 of the distributed antenna system 100 is equal to the number of third optical ports 240 included in the third optical module 230. For example, as shown in FIG. 2, in the scenario where the third optical module 230 employs 1*8 third optical ports 240 (that is, each third optical module 230 includes eight third optical ports 240), the relay device 20 may be connected with up to 8 far-end devices 30.

Therefore, in this working mode, a near-end device 10 of the distributed antenna system 100 may be connected with up to the second number of relay devices, and each relay device 20 may be connected with up to the fifth number of far-end devices 30. For example, in the scenario where each first optical module 110 includes 8 optical ports (that is, the second number is 8), and each third optical module 230 includes 8 optical ports (that is, the fifth number is 8), the number ratio among the near-end device 10, the relay device 20, and the far-end device 30 supported by the distribute antenna system 100 may be up to 1:8:64. For another example, when each first optical module 110 includes 8 optical ports (that is, the second number is 8), and each third optical module 230 includes 6 optical ports (that is, the fifth number is 6), the number ratio among the near-end devices 10, relay devices 20, and far-end device 30 supported by the distributed antenna system 100 may be up to 1:8:48.

In the working mode shown in FIG. 2, next level devices of the distributed antenna system 100 may be connected by 4 optical fibers, so 4 radio frequency signals may be transmitted (such as radio frequency signals from a base station to a user's mobile terminal, and vice versa). In the present disclosure, such radio frequency signals are also referred to as communication signals. On the other hand, to monitor the optical fiber connection status between the devices at all levels in the system 100, one of the optical fiber connections may be selected to transmit the monitoring signal. For example, as shown in FIG. 2, the connection between the first optical port 120-1 of the first optical module 110 of the near-end device 10 and the second optical port 220-A of the second optical module 210 of the relay device 20 (such as the relay device 20-1) may be selected, to transmit the monitoring signal. Hereinafter, the connection is referred to as the main link A or the first main link. In addition, the connection from the first optical port 120-9 of the first optical module 110 of the near-end device 10 to the second optical port 220-B of the second optical module 210 of the relay device 20-1 may also be selected as a backup link, to transmit the monitoring signal when the main link A is not connected or disconnected. Hereinafter, the backup link is also referred to as backup link B or the first backup link. Similarly, the connection of the third optical port 240-1 of the third optical module 230 of the relay device 20 (for example, the relay device 20-1) to the fourth optical port 240-1 of the fourth optical module 310 of the far-end device 30 (for example, the far-end device 30-1) may be selected as the main link, namely main link K or the second main link, and the connection of the third optical port 240 of the third optical module 230 of the relay device 20-1 to the fourth optical port 320-L of the fourth optical module 310 of the far-end device 30-1 is used as a backup link, namely the backup link L or the second backup link.

To control each optical module and optical port of each optical module in sending and receiving monitoring signals, in the distributed optical fiber system 100, each optical port (including each first optical port, second optical port, third optical port, and fourth optical port) are respectively configured with optical switches to enable or disable the sending or receiving of the corresponding optical ports. The optical switch may be an optical receiving switch or an optical emitting switch. The optical receiving switch is used to control whether the corresponding optical port may receive signals, and the optical sending switch is used to control whether the corresponding optical port may send signals. In the present disclosure, an optical receiving switch is used as an example of an optical switch for each optical port. Currently, optical receiving switches are simpler and less costly to implement than optical emitting switches, however, the present disclosure is not limited to this. The monitoring signal may differ than the communication signal in carrier frequency, so an additional frequency shift keying (FSK) function may be implemented on a conventional optical switch to switch the signal reception and demodulation of the optical port to a different carrier frequency. Therefore, in the present disclosure, the optical switch is also referred to as an FSK switch or an optical switch with FSK function.

In addition, and in some implementations, considering that the monitoring signal is only transmitted through the main link K or the backup link L, and the far-end device 30 needs to be as small as possible, only one FSK switch may be set in the far-end device 30 to switch between the fourth optical port 320-K and 320-L, to realize the switching between the main link K and the backup link L.

FIG. 3 shows a schematic diagram of the structure and connection relationship of the distributed antenna system 100 in another working mode according to certain embodiments of the present disclosure. The working mode shown in FIG. 3 is 2T2R (that is, 2 transmissions and 2 receptions) mode, that is, the upper and lower-level devices of the distributed antenna system 100 are respectively connected by two optical fibers to form two physical optical fiber links. Note that the difference between the distributed antenna system 100 shown in FIG. 3 and the distributed antenna system 100 shown in FIG. 2 mainly lies in the difference in the number of optical fibers (for example, optical links) connecting devices of adjacent levels. Although the relay device 20 is shown in FIG. 3 as including two second optical modules 210, those skilled in the art may understand that the relay device 20 in FIG. 3 may include the same number of second optical modules 210 of the relay device 20 shown in FIG. 2.

In the working mode shown in FIG. 3, adjacent-level devices of the distributed antenna system 100 may be connected through two optical fibers, such that two channels of radio frequency signals, that is, communication signals, may be transmitted. On the other hand, similar to FIG. 2, to monitor the optical fiber connection status between devices at all levels in the system 100, one connection may be selected as the main link for transmitting monitoring signals, and another connection as a backup link for transmitting monitoring signals. For example, as shown in FIG. 3, the connection between the first optical port 120-1 of the first optical module 110 of the near-end device 10 and the second optical port 220-A of the second optical module 210 of the relay device 20 (such as the relay device 20-1) may be selected as a main link, which is called a main link A or a first main link, and the connection between the third optical port 240-9 of the third optical module 230 of the relay device 20-1 and the fourth optical port 320-L of the fourth optical module 310 of the far-end device 30-1 is used as a backup link, which is called a backup link L or a second backup link.

Figure 4:
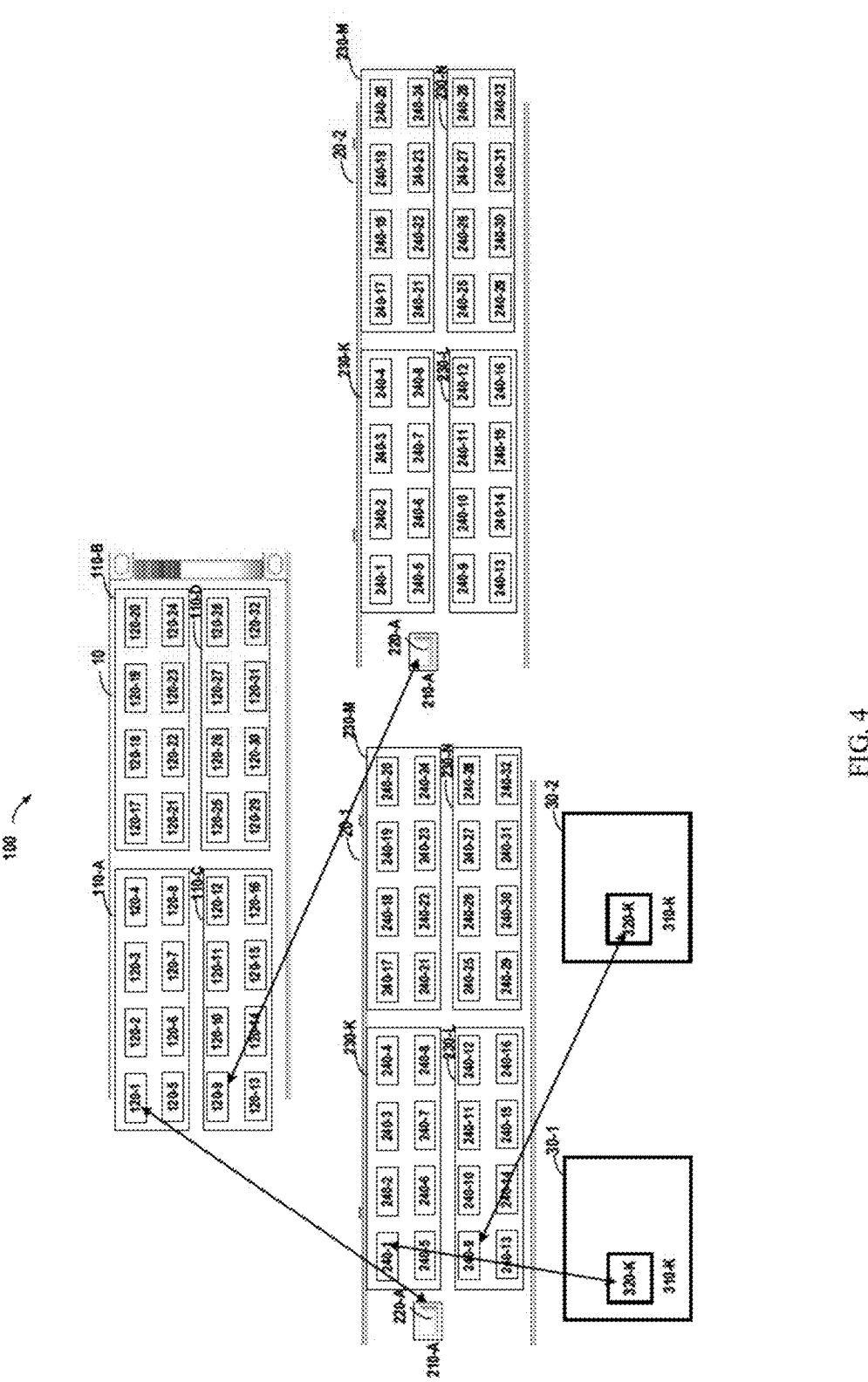
FIG. 4 shows a schematic diagram of the structure and connection relationship of a distributed antenna system in another working mode according to certain embodiments of the present disclosure.

FIG. 4 shows a schematic diagram of the structure and connection relationship of the distributed antenna system 100 in another working mode according to certain embodiments of the present disclosure. The working mode shown in FIG. 4 is 1T1R (that is, 1 transmission and 1 reception) mode, that is, the upper and lower-level devices of the distributed antenna system 100 are connected through one optical fiber to form one physical optical fiber link. In the present disclosure, this working mode is also referred to as single-channel transceiver mode, and the working mode of multiple optical fibers (for example, as shown in FIG. 2 and FIG. 3) is called multi-channel transceiver mode.

In the working mode shown in FIG. 4, the adjacent-level devices of the distributed antenna system 100 are only connected by one optical fiber, such that only one radio frequency signal, that is, the communication signal, may be transmitted. In addition, similar to FIG. 2 and FIG. 3, to monitor the status of optical fiber connections between devices at all levels in the system 100, the same link may be used to transmit monitoring signals. Different from the working mode shown in FIG. 2 and FIG. 3, this single-channel transceiver mode does not have a backup link.

Note that the number of optical modules and/or the number of optical ports of the optical modules in each device shown in FIGS. 2 to 4 are merely exemplary. Depending on implementation requirements or cost considerations, the number of optical modules and/or the number of optical ports of each optical module in different distributed antenna systems 100 may be different. For example, in certain embodiments, each first optical module 110 may have 6 or 4 first optical ports 120, and/or the third optical module 230 may have 6 or 4 third optical ports 240, and the like. In certain embodiments, the same distributed antenna system 100 may work in different working modes with different connection relationships. For example, in the distributed antenna system 100 shown in FIG. 3, the relay device 20 may also include 4 second optical modules 210-A, 210-B, 210-C, and 210-D as shown in FIG. 2. However, when working in 2T2R mode, 2 second optical modules (for example, second optical modules 210-A and 210-B) out of 4 second optical modules 210-A, 210-B, 210-C, and 210D are connected to 2 first optical modules 110 (such as the first optical modules 110-A and 110-B) of the near-end device 10, and the other two second optical modules (such as the second optical modules 210-C and 210-D) are connected to other two first optical modules 110 (such as first optical modules 110-C and 110-D) of the near-end device 10.

Note that the above-mentioned FIGS. 2 to 4 and Tables 1 to 4 exemplarily show that a first optical port of each optical module of the upper-level device is connected to a first lower-level device, and a second optical port is connected to a second lower-level device, that is, connections are respectively made to different lower-level devices in sequence according to the order of the optical ports. However, those skilled in the art may understand that the present disclosure is not limited thereto, and in each working mode, it is fine as long as each optical port of each optical module of the upper-level device and the lower-level equipment are pre-configured with predetermined connection relationship (correspondence relationship).

In addition, FIG. 2 to FIG. 4 only show that the near-end device 10 is connected to two relay devices 20-1 and 20-2 for the purpose of illustration, and one relay device 20 (such as the relay device 20-1) is connected to two far-end devices 30-1 and 30-2. In fact, in the various working modes shown, the near-end device 10 may be connected to more relay devices 20, and one relay device 20 may be connected to more far-end devices 30.

In the distributed antenna system 100, a first carrier frequency may be used to transmit monitoring signals between the near-end device 10 and the relay device 20, such as transmitting the operation monitoring message described below, the operation information of the relay device 20, the first monitoring message, the identification information of the relay device 20, the first address assignment message, address assignment success information, and the like, as described below. The first carrier frequency may be, for example, a 433 MHz carrier frequency. A second carrier frequency different from the first carrier frequency may be used to transmit monitoring signals between the relay device 20 and the far-end device 30, for example, the transmission of the operation monitoring message, the operation information of the far-end device 30, the second monitoring message, identification information of the far-end device 30, second address assignment message, address assignment success information, and the like, as described below. The second carrier frequency may be, for example, a 315 MHz carrier frequency. By using different carrier frequencies on the optical fiber link between the near-end device 10 and the relay device 20 and the optical fiber link between the relay device 20 and the far-end device 30 to transmit the monitoring signal, signal interference between two fiber optic links may thus be effectively avoided.

As previously mentioned, because the near-end device 10, the relay device 20 and the far-end device 30 are usually located at different physical locations, and the like, it is difficult to automatically monitor the link status of the distributed antenna system 100 in various operating modes. For this reason, in the solution according to the present disclosure, corresponding control modules may be configured at the near-end device 10, each relay device 20, and each far-end device 30, or corresponding control modules may be configured at each optical port of each device, such as the control module 800 described below in conjunction with FIG. 8, to perform the monitoring functions described herein. Here, each control module may be a hardware circuit or a chip capable of implementing various operations of the methods 500 to 700 described below in conjunction with FIGS. 5A, 5B, 6 and 7.

Figure 5A:
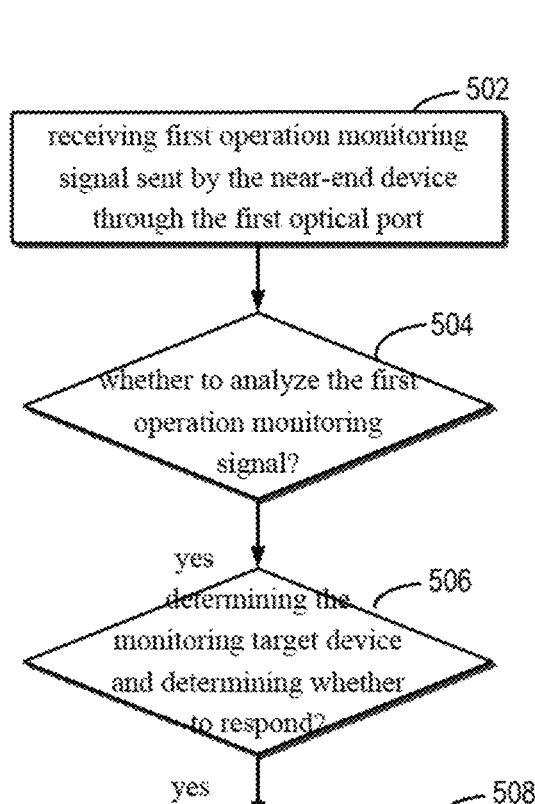
FIG. 5A shows a flowchart of a monitoring method for a distributed antenna system according to certain embodiments of the present disclosure.

FIG. 5A shows a flowchart of an optical fiber monitoring method 500 for the distributed antenna system 100 according to certain embodiments of the present disclosure. In the optical fiber monitoring method 500 shown in FIG. 5A, description is made in view of the working mode shown in FIG. 2 taken as an example, but those skilled in the art may understand that the present disclosure is not limited thereto. The monitoring method 500 described in conjunction with FIG. 5A may be applied to various working modes. The monitoring method 500 may be used to monitor the operating information of each device (such as each relay device 20 and/or each far-end device 30) of the distributed antenna system 100, such as optical receiving power, device temperature, device alarm status, attenuation value, and device location information, and the like. In the following description, the monitoring method of the present disclosure is described by taking optical receiving power as an example, but those skilled in the art may understand that the method of the present disclosure may be conveniently used to monitor other operating information.

As shown in FIG. 5A, at block 502, the near-end device 10 may send an operation monitoring signal through the first optical port 120. The operation monitoring signal is an optical signal that may be transmitted through an optical fiber. To distinguish it from an operation monitoring signal sent by the relay device 20 described below, the operation monitoring signal sent by the near-end device 10 to the relay device 20 is also referred to as a first operation monitoring signal here. It has a first carrier frequency (for example, 433 MHz), and the operation monitoring signal sent by the relay device 20 to the far-end device 30 is called a second operation monitoring signal, which has a second carrier frequency (for example, 315 MHz). The first operation monitoring signal may carry an operation monitoring message. The operation monitoring message may include an address of a monitoring target device. For example, when the monitoring target device is a relay device 20 (for example, the relay device 20-1), the address of the relay device 20 may be included in the operation monitoring message. For another example, when the monitoring target device is a far-end device 30 (such as the far-end device 30-2), the operation monitoring message should include an address of the far-end device 30-2 and an address of the relay device 20 (such as the relay device 20-1) positioned between the near-end device 10 and the far-end device. Here, suppose the monitoring target device is the far-end device 30-2 of the relay device 20-1.

Here, the address of the relay device 20 and/or the address of the far-end device 30 may be a pre-assigned fixed address. However, due to the use of pluggable optical fiber connections, the connection between the optical ports of adjacent-level devices may change, so it is possible, prior to monitoring each time or when the alarm state of the optical port changes, to assign addresses for the relay device 20 and/or the far-end device 30 to facilitate subsequent monitoring, that is, to realize dynamic address assignment. The method for dynamic address assignment is described below in conjunction with FIG. 6 and FIG. 7, which may be used as a part of method 500, or may be implemented separately.

Correspondingly, one or more relay devices 20 may receive the first operation monitoring signal.

At block 504, the second optical module 210 of each relay device 20 may determine whether to analyze the first operation monitoring signal according to the connection status between the second optical module 210 and the near-end device 10. Here, the connection status between the second optical module 210 and the near-end device 10 may be normal and abnormal. When the optical receiving alarm at the second optical module 210 is abnormal (that is, the second optical module 210 is not connected to the near-end device 10 through an optical fiber) or the optical receiving power at the second optical module 210 is too low (for example, it is lower than a certain threshold so that information may not be effectively extracted from the optical signal received at the second optical module 210), the connection status between the second optical module 210 and the near-end device 10 is abnormal, and at this time the second optical module 210 may determine not to analyze the first operation monitoring signal. On the contrary, when the optical receiving alarm at the second optical module 210 is normal (that is, the second optical module 210 is connected to the near-end device 10 through an optical fiber) or the optical receiving power at the second optical module 210 is normal (for example, sufficient enough for the information to be effectively extracted from the optical signal received at the second optical module 210), the connection status between the second optical module 210 and the near-end device 10 is normal, and at this time the second optical module 210 may determine to analyze the first operation monitoring signal.

For example, suppose for the relay devices 20-1 and 20-2, the connection status of the second optical modules 210-B, 210-C and 210-D to the near-end device 10 is abnormal, so these second optical modules 210 do not analyze the first operation monitoring signal upon the latter's receipt. For another example, suppose for the second optical modules 210-A of the relay devices 20-1 and 20-2, the connection status with the near-end device 10 is normal, so it is determined that the first operation monitoring signal should be analyzed. In certain embodiments, the first operation monitoring signal may be analyzed by turning on the FSK switch of the second optical port 220 of the second optical module 210, and the operation monitoring message is extracted from the optical signal of the first carrier frequency (for example, 433 MHz) received at the second optical port 220. At block 506, in response to the second optical module 210 of the relay device 20 determines to analyze the first operation monitoring signal, the first operation monitoring signal is analyzed to determine the monitoring target device and whether to respond to the operation monitoring message. Analyzing the first operation monitoring signal by the second optical module 210 may include analyzing the first operation monitoring signal according to the first carrier frequency to extract the operation monitoring message therefrom.

In certain embodiments, suppose the operation monitoring message only includes the address of the relay device 20-1, it may be determined that the monitoring target device is the relay device 20-1.

In certain other embodiments, suppose the operation monitoring message includes the address of the relay device 20-1 and the address of the far-end device 30-2, it may be determined that the monitoring target device is the far-end device 30-2 of the relay device 20-1.

As mentioned above, both the second optical modules 210-A of the relay devices 20-1 and 20-2 analyze the first operation monitoring signal, and determine the monitoring target device is the relay device 20-1 or the far-end device 30-2 associated with the relay device 20-1 according to the device address included in the operation monitoring message. In this scenario, the second optical module 210-A of the relay device 20-1 may determine to respond to the operation monitoring message, while the second optical module 210-A of the relay device 20-2 may determine not to respond to the operation monitoring message.

At block 508, in response to the second optical module 210 of the relay device 20 at block 506 determines that it needs to respond to the operation monitoring message, then the operation monitoring message is responded to according to the monitoring target device.

On the other hand, in response to the judgment at block 504 or block 506 is negative, operation of method 500 may be terminated (not shown in the figure).

In certain embodiments, the monitoring target device is the relay device 20-1. In this scenario, the second optical module 210-A of the relay device 20-1 may obtain operation information of the relay device 20-1 as a response to the operation monitoring message. For example, the operation information may include the optical receiving power of the second optical module 210-A of the relay device 20-1, that is, the optical receiving power of the above-mentioned main link A. Subsequently, the second optical module 210-A of the relay device 20-1 may send the optical receiving power back to the near-end device 10 along the main link A.

In certain other embodiments, the monitoring target device is a far-end device 30-2 of the relay device 20-1. In this scenario, the relay device 20-1 may continue to send the second operation monitoring signal through its third optical port 230, and the second operation monitoring signal also carries the operation monitoring message. For example, in the example shown in FIG. 2, the relay device 20-1 may be connected to a maximum of 8 far-end devices 30 through 32 third optical ports 240 of 4 third optical modules 230. In this scenario, the relay device 20-1 may send the operation monitoring message through all 32 of its third optical ports 240.

Figure 5B:
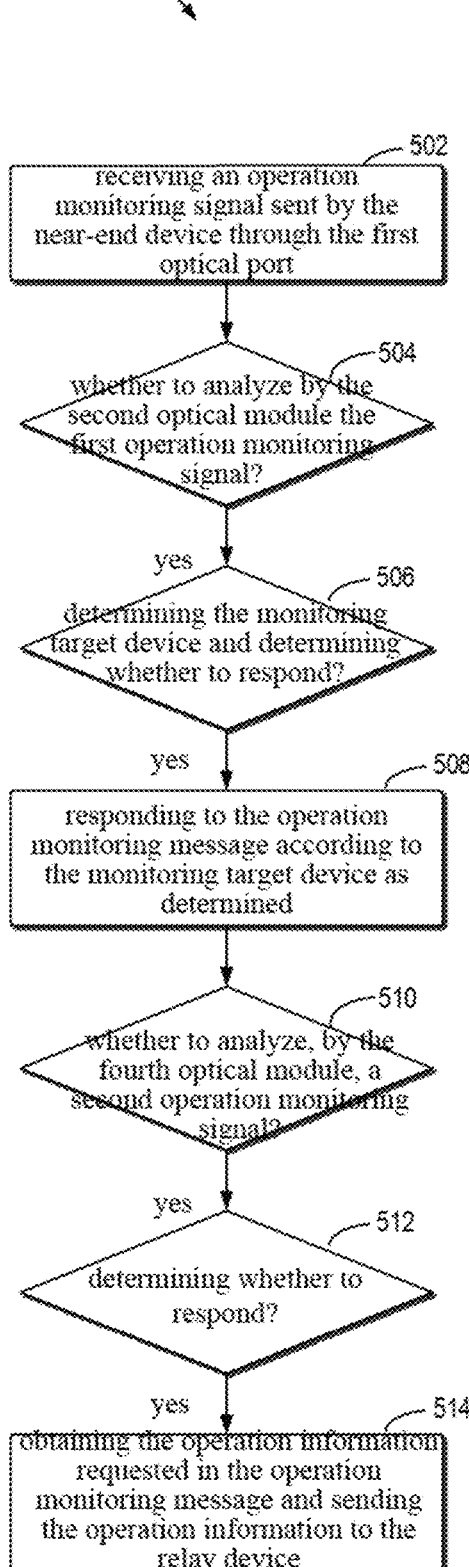
FIG. 5B shows a flowchart of a monitoring method for a distributed antenna system according to certain other embodiments of the present disclosure.

Each far-end device 30 connected to the relay device 20-1 may process the second operation monitoring signal in a manner similar to that described at blocks 502 to 508 above. In this scenario, the monitoring method 500 may also include a processing flow at each far-end device 30. FIG. 5B shows a flowchart of a monitoring method 500 of the distributed antenna system 100 according to other embodiments of the present disclosure. Blocks 502 to 508 of the monitoring method 500 in FIG. 5B are the same as those in FIG. 5A, and will not be repeated here. When it is determined at block 508 that the monitoring target device is a far-end device 30 of the relay device 20-1, the second operation monitoring signal is sent through the third optical port 240 of the relay device 20-1, and the blocks 510-514 described below are executed at the each far-end device 30 connected to the relay device 20-1. After the relay device 20-1 sends the second operation monitoring signal through the third optical port 240, one or more far-end devices 30 may receive the second operation monitoring signal.

Specifically, as shown in FIG. 5B, at block 510, each fourth optical module 310 of each far-end device 30 determines whether to analyze the second operation monitoring signal respectively according to the connection status with the relay device 20. Similarly, when the optical receiving alarm at the fourth optical module 310 is abnormal or the optical receiving power at the fourth optical module 310 is too low, the connection status between the fourth optical module 310 and the relay device 20 is abnormal. At this time, the four-optical module 310 may determine not to analyze the second operation monitoring signal. When the optical receiving alarm at the fourth optical module 310 is normal and the optical receiving power at the fourth optical module 310 is high enough, the connection status between the fourth optical module 310 and the relay device 20 is normal, and at this time the fourth optical module 310 may determine to analyze the second operation monitoring signal.

For example, suppose for the far-end devices 30-1 and 30-2, the connection status of the fourth optical modules 310-L, 310-M and 310-N to the relay device 20 is abnormal, so these fourth optical modules do not analyze the second operation monitoring signal upon latter's receipt. Suppose for the fourth optical modules 310-K of the far-end devices 30-1 and 30-2, the connection status with the relay device 20 is normal, so it is determined that the second operation monitoring signal should be analyzed. In certain embodiments, the second operation monitoring signal may be analyzed by turning on the FSK switch of the fourth optical port 320 of the fourth optical module 310, and the operation monitoring message is extracted from the optical signal of the second carrier frequency (for example, 315 MHz) received from the fourth optical port 320.

In response to a fourth optical module 310 of the far-end device 30 determines at block 510 to analyze the second operation monitoring signal, then the far-end device 30 analyzes the second operation monitoring signal to determine whether to respond to the operation monitoring message.

For example, the fourth optical module 310-K of each far-end device 30 analyzes the second operation monitoring signal and determines that the address of the far-end device 30-2 is included, that is, the monitoring target device is the far-end device 30-2.

In this scenario, the fourth optical module 310-K of the far-end device 30-1 may determine that there is no need to respond to the operation monitoring message, while the fourth optical module 310-K of the far-end device 30-2 may determine to respond to the operation monitoring message.

At block 514, in response to the fourth optical module 310-K of the far-end device 30-1 determines at block 512 to respond to the operation monitoring message, operation information requested by the operation monitoring message may be obtained and then the operation information may be sent back to the relay device 20-1.

As mentioned above, the fourth optical module 310-K of the far-end device 30-2 may acquire the operation information of the far-end device 30-2 as a response to the operation monitoring message. For example, the operation information may include the optical receiving power of the fourth optical module 310-K of the far-end device 30-2, that is, the optical receiving power of the above-mentioned main link K. Subsequently, the fourth optical module 310-K of the far-end device 30-2 may send the optical receiving power back to the relay device 20-1 along the main link K, and continue to send the optical receiving power back to the near-end device 10 along the main link A.

In this way, operation information of each device in the distributed antenna system 100 may be monitored, to obtain the operation status of the entire distributed antenna information 100. Among them, at the relay device 20 or the far-end device 30, it is desirable to determine whether to respond to the operation monitoring message according to the device address of the monitoring target device. As mentioned above, the device address may be a pre-assigned fixed address or a dynamically assigned address. Since it may be impossible to determine that the optical fiber connection is correct before monitoring, in the scenario of a wrong optical fiber connection, using a pre-assigned fixed address may result in an inability to accurately obtain the operating information of the monitoring target device. Therefore, in certain embodiments according to the present disclosure, a scheme for assigning addresses to each relay device 20 and far-end device 30 in the distributed antenna system 100 is also provided.

FIG. 6 shows a flowchart of an address assignment method 600 for the distributed antenna system 100 according to certain embodiments of the present disclosure. The address assignment method 600 is used to realize that the near-end device 10 assigns relay device addresses to multiple relay devices 20 connected thereto. In the address assignment method 600 shown in FIG. 6, description is made in view of the connection relationship and working mode shown in FIG. 2. However, those skilled in the art may understand that the present disclosure is not limited thereto, and the address assignment method 600 described in conjunction with FIG. 6 may be applied to various working modes. Before the method 600 starts, the near-end device 10 is respectively connected to the relay devices 20-1 through four optical fibers and connected to the relay device 20-2 through four optical fibers. That is, the first optical ports 120-1, 120-9, 120-17, and 120-25 of the near-end device 10 are respectively connected to the second optical ports 220-A, 220-B, 220-C, and 220-D of the relay device 20-1, the first optical ports 120-2, 120-10, 120-18 and 120-26 of the near-end device 10 are respectively connected to the second optical ports 220-A, 220-B, 220-C, and 220-D of the relay device 20-2.

As shown in FIG. 6, at block 602, the near-end device 10 may turn off all optical switches of the first optical port 120. Here, similar to FIGS. 5A and 5B, the optical switch may be an optical receiving switch.

At block 604, the near-end device 10 turns on the optical switch of the first optical port 120 (for example, the first optical port 120-1 and 120-9) corresponding to the first main link (for example, the main link A) and the first backup link (for example, the backup link B) of the target relay device 20. Here, the near-end device 10 may assign an address to each relay device 20 in a polling manner, so the relay device 20 that is being assigned an address is also called a target relay device.

At block 606, the near-end device 10 sends a first monitoring message through all the first optical ports 120, where the first monitoring message is used to acquire the identification information of the target relay device 20. Here, the first monitoring message may be a simple trigger signal to trigger the relay device 20 receiving the first monitoring signal to upload its identification information without containing any identity information of the target relay device 20. Here, the identification information of the device may include information such as the device number, serial number, and frequency band information that uniquely identify the device.

At block 608, the relay device 20 receiving the first monitoring message may determine whether the alarm state of the second optical module 210-A corresponding to the first main link of the relay device 20 is normal. Here, in the scenario of using an optical receiving switch, the alarm status of the second optical module 210-A includes an optical receiving alarm status, that is, when the second optical module 210-A is connected to an optical fiber, its alarm status is normal, and when the second optical module 210-A is not connected to the optical fiber or the optical fiber is disconnected, its alarm status is abnormal.

Although the near-end device 10 sends the monitoring signal through all of its first optical ports 120, since the near-end device 10 is only connected to the relay devices 20-1 and 20-2 through optical fibers, only the relay device 20-2 1 and 20-2 may receive the monitoring signal. The relay devices 20-1 and 20-2 may respectively determine whether the alarm state of the second optical module 210-A corresponding to the main link A is normal.

In response to a relay device 20 determines that the alarm state of the second optical module 210-A corresponding to its first main link is normal, then at block 610, the relay device 20 may turn off other optical switches of the second optical modules 210 and send the identification information of the relay device 20 to the near-end device 10 through the first main link.

Specifically, in response to the relay devices 20-1 and 20-2 determine that the alarm states of the respective second optical modules 210-A are normal, that is, determine that the main link A is in the connected state, then respective optical switches of the second optical modules 210-B, 210-C and 210-D may be turned off to discard the first monitoring message received through the corresponding optical fiber link, and the identification information may be sent to the near-end device through the main link A, respectively. In the single-channel transceiver mode as shown in FIG. 4, the relay device 20 may send its identification information to the near-end device 10 through its main link A. In fact, in the single-channel transceiver mode, there is no backup link between the near-end device 10 and the relay device 20, so the main link A or the first main link may also be directly referred to as link A or the first link.

In the single-channel transceiver mode, in response to the alarm state of the second optical module 210-A corresponding to link A is abnormal, the method 600 may be terminated.

In the multi-channel transceiver mode (for example, the 4T4R mode and 2T2R mode as shown in FIG. 2 and FIG. 3), in response to the alarm status of the second optical module 210-A corresponding to the main link A is abnormal, a corresponding backup link B may be chosen to send the identification information.

Specifically, in response to a relay device 20 determines that the alarm state of the second optical module 210-A corresponding to its first main link is abnormal, then at block 612, the relay device 20 may use a backup link (that is, backup link B) to send the identification information of the relay device 20 to the near-end device 10. At this time, the relay device 20 may turn on the optical switch of the second optical module 210 corresponding to the first backup link (that is, the second optical module 210-B), and turn off the optical switches of other second optical modules 210. In this way, even in the scenario of failure or disconnection of the main link, the address assignment function may be successfully performed. Further, when switching from the first main link to the first backup link, the optical switch corresponding to the first backup link is turned on and other optical switches are turned off, so that the data sent and received through the first backup link will not be mixed with other data.

At block 604, only the optical switches of the first optical ports 120-1 and 120-9 corresponding to the first main link and the first backup link of the target relay device 20-1 are turned on. Therefore, in response to the relay devices 20-1 and 20-2 both send their respective identification information to the near-end device 10, the near-end device 10 may only receive the identification information of the target relay device 20-1 to avoid confusion.

In response to receiving the identification information of the target relay device 20-1, at block 614, the near-end device 10 sends a first address assignment message to the target relay device 20-1, where the first address assignment message includes the relay device address assigned by the near-end device 10 to the target relay device 20-1. Where, the relay device address of each relay device 20 is unique between the near-end device 10 and multiple relay devices 20. In response to receiving the identification information of the target relay device 20-1, at block 614, the near-end device 10 sends a first address assignment message to the target relay device 20-1, where the first address assignment message includes the relay device address assigned by the near-end device 10 to the target relay device 20-1. Where, the relay device address of each relay device 20 is unique between the near-end device 10 and multiple relay devices 20.

Through the above blocks 602 to 614, the near-end device 10 assign a unique relay device address to a relay device 20.

In certain embodiments, by including the identification information of the target relay device 20-1 in the first address assignment message, the target relay device 20-1 may verify the received relay device address.

In this scenario, the method 600 may also include block 616, where after receiving the first address assignment message, the target relay device 20-1 compares the identification information included in the first address assignment message and the identification information of the target relay device 20-1 itself.

In response to the identification information contained in the first address assignment message is consistent with the identification information of the target relay device 20-1 itself, then at block 618, the target relay device 20-1 may set the relay device address contained in the first address assignment message as the address of the target relay device 20-1, and at block 620, return address assignment success information to the near-end device 10 through the first main link (determined as yes at block 608) or the first backup link (determined as no at block 608).

On the other hand, in response to the identification information contained in the first address assignment message is inconsistent with the identification information of the target relay device 20-1 itself, then at block 622, the target relay device 20-1 may return an error message to the near-end device 10 through the first main link (determined as yes at block 608) or the first backup link (determined as no at block 608).

In this way, the near-end device 10 may assign addresses to each relay device 20 in turn, so that all relay devices 20 are assigned a unique relay device address.

Further, in certain embodiments, each relay device 20 may also assign an address to the far-end device 30 connected to it. FIG. 7 shows a flowchart of an address assignment method 700 for a distributed antenna system 100 according to certain embodiments of the present disclosure. The address assignment method 700 is used to realize that the relay device 20 assigns addresses to multiple far-end devices 30 connected to it. In the address assignment method 700 shown in FIG. 7, description is made in view of the connection relationship and working mode shown in FIG. 2. However, those skilled in the art may understand that the present disclosure is not limited thereto, and the address assignment method 700 described in conjunction with FIG. 7 may be applied to various working modes. Before the method 700 starts, a relay device 20 (such as the relay device 20-1) is respectively connected to the far-end device 30-1 through four optical fibers and connected to the far-end device 30-2 through four optical fibers. That is, the third optical ports 240-1, 240-9, 240-17, and 240-25 of the relay device 20-1 are respectively connected to the fourth optical ports 320-K, 320-L, 320-M, and 32-N of the far-end device 30-1, and the third optical ports 240-2, 240-10, 240-18 and 240-26 of the relay device 20-1 are respectively connected to the fourth optical port 320-K, 320-L, 320-M, and 320-N of the far-end device 30-2. Note that the address assignment method 700 may be implemented in combination with the address assignment method 600 shown in FIG. 6, or may be implemented separately.

As shown in FIG. 7, at block 702, the relay device 20-1 may turn off all the optical switches of the third optical port 240.

At block 704, the relay device 20-1 turns on the optical switch of the third optical port 240 corresponding to the second main link (that is, the main link K) and the second backup link (that is, the backup link L) of the target far-end device 30. Here, the relay device 20 may assign an address to each far-end device 30 in a polling manner, so the far-end device 30 to which address assignment is being performed on is also referred to as a target far-end device.

At block 706, the relay device 20-1 sends a second monitoring message through all the third optical ports 240, where the second monitoring message is used to obtain identification information of the target far-end device 30. Here, the second monitoring message may be a simple trigger signal to trigger the far-end device 30 receiving the monitoring signal to upload its identification information without including any identity information of the target far-end device 30.

At block 708, the far-end device 30 receiving the second monitoring message may determine whether the alarm state of the fourth optical module 310-K corresponding to the second main link of the far-end device 30 is normal. Here, in the scenario of using an optical receiving switch, the alarm status of the fourth optical module 310-K includes the optical receiving alarm status, that is, when the fourth optical module 310-K is connected to an optical fiber, its alarm status is normal, and when the fourth optical module 310-K is not connected to an optical fiber or the optical fiber is disconnected, its alarm status is abnormal.

The relay device 20-1 sends the second monitoring signal through all of its third optical ports 240. However, because the relay device 20-1 is only connected to the far-end devices 30-1 and 30-2 through optical fibers, only the far-end devices 30-1 and 30-2 may receive the second monitoring signal. The far-end devices 30-1 and 30-2 may respectively determine whether the alarm state of the fourth optical module 310-K corresponding to the main link K is normal.

In response to a far-end device 30 determines that the alarm status of the fourth optical module 310-K corresponding to its second main link is normal, then at block 710, the far-end device 30 may turn off other optical switches of the fourth optical module 310 and send the identification information of the far-end device 30 to the relay device 20-1 through the second main link.

Specifically, in response to the far-end devices 30-1 and 30-2 determine that the alarm states of their respective fourth optical modules 310-K are normal, that is, determine that the main link K is in a connected state, optical switches of respective fourth optical modules 310-L, 310-M, and 310-N may be turned off to discard the second monitoring message received through the corresponding optical fiber link, and respective identification information is sent to the relay device 20-1 through the main link K. In the single-channel transceiver mode shown in FIG. 4, the far-end device 30 may send its identification information to the relay device 20-1 through its main link K. In fact, in the single-channel transceiver mode, there is no backup link between the relay device 20 and the far-end device 30, so the main link K or the second main link may also be directly referred to as link K or the second link.

In the single-channel transceiver mode, in response to the alarm state of the fourth optical module 310-K corresponding to the link K is abnormal, the method 700 may be terminated.

In the multi-channel transceiver mode (for example, the 4T4R mode and 2T2R mode as shown in FIG. 2 and FIG. 3), in response to the alarm status of the fourth optical module 310-K corresponding to the main link K is abnormal, the corresponding backup link L may be chosen to send the identification information.

Specifically, in response to a far-end device 30 determines that the alarm state of the fourth optical module 310-K corresponding to its second main link is abnormal, then at block 712, the far-end device 30 may send the identification information of the far-end device 30 to the relay device 20-1 through the second backup link (that is, the backup link L). At this time, the far-end device 30 may turn on the optical switch of the fourth optical module 310 (that is, the fourth optical module 310-L) corresponding to the second backup link, and turn off the optical switches of other fourth optical modules 310. In certain embodiments, the far-end device 30 may switch from the second main link to the second backup link through an FSK switch. In this way, the area occupied by the optical switch on the far-end device 30 may be further reduced, which is particularly beneficial when the area of the far-end device 30 itself is limited.

In this way, even in the scenario of failure or disconnection of the main link, the address assignment function may be successfully performed, and when switching from the second main link to the second backup link, the data sent and received by the backup link will not be commingled other data.

At block 704, only the optical switches of the third optical ports 240-1 and 240-9 corresponding to the second main link and the second backup link of the target far-end device 30-1 are turned on. Therefore, in response to the far-end devices 30-1 and 30-2 both send their identification information to the relay device 20-1, the relay device 20-1 may only receive the identification information of the target far-end device 30-1, to avoid confusion.

In response to receiving the identification information of the target far-end device 30-1, at block 714, the relay device 20-1 may also send a second address assignment message to the target far-end device 30-1, where the second address assignment message includes the far-end device address assigned by the relay device 20-1 to the target far-end device 30-1. Where, the far-end device address of each far-end device 30 is unique between the relay device 20 and the multiple far-end devices 30 connected to the relay device 20.

Through the above blocks 702 to 714, the relay device 20 may assign a unique far-end device address to a far-end device 30.

In certain embodiments, by including the identification information of the target far-end device 30-1 in the second address assignment message, the target far-end device 30-1 may verify the far-end device address as received.

In this scenario, the method 700 may also include block 716, where after receiving the second address assignment message, the target far-end device 30-1 compares the identification information contained in the second address assignment message with the identification information of the target far-end device 30-1 itself.

In response to the identification information contained in the second address assignment message is consistent with the identification information of the target far-end device 30-1 itself, then at block 718, the target far-end device 30-1 may set the far-end device address contained in the second address assignment message as the address of the target far-end device 30-1, and at block 720, return address assignment success information to the rely device 20-1 through the second main link (determined as yes at block 708) or the second backup link (determined as no at block 708).

On the other hand, in response to the identification information contained in the second address assignment message is inconsistent with the identification information of the target far-end device 30-1 itself, then at block 722, the target far-end device 30-1 may return error information to the relay device 20-1 through the second main link (determined as yes at block 708) or the second backup link (determined as no at block 708).

Using the method 600 shown in FIG. 6 and/or the method 700 shown in FIG. 7, addresses may be dynamically assigned to the devices in the distributed antenna system 100, and each time an optical fiber is inserted into or removed from the system 100 or there is a new relay device 20 and/or far-end device 30 being connected into the system 100, addresses may be automatically assigned to devices of the system 100 according to the alarm state of the optical module.

In addition, after the execution of method 600 and/or method 700 is performed, the distributed antenna system 100 (for example, each control module 800 therein) may automatically refresh the topology of the system architecture and display it on the web side, such that operation maintenance personnel may easily monitor the link status.

Figure 8:
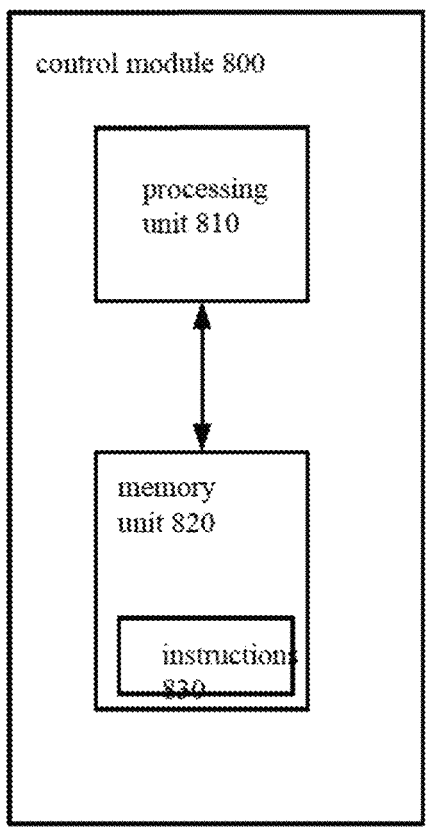
FIG. 8 shows a schematic structural diagram of a control module according to certain embodiments of the present disclosure.

FIG. 8 shows a schematic structural diagram of a control module 800 according to certain embodiments of the present disclosure. The control module 800 may be implemented in any one of the near-end device 10, the relay device 20, and the far-end device 30. The control module 800 may also be referred to as control circuit.

As shown in FIG. 8, the control module 800 may include one or more processing units 810. The processing unit 810 controls the operation and functions of the control module 800. For example, in certain embodiments, processing unit 810 may perform various operations by way of instructions 830 stored in one or more memory units 820 coupled thereto. Memory unit 820 may be of any suitable type suitable for the local technical environment and may be implemented using any suitable data storage technology, including but not limited to semiconductor-based storage devices, magnetic storage devices and systems, optical storage devices and systems. Although only one processing unit 810 and one memory unit 820 are shown in FIG. 8, there may be more physically different processing units 810 and memory units 820 in the control module 800.

The processing unit 810 may be of any suitable type suitable for the local technical environment, and may include, but is not limited to, a microprocessor, a digital signal processor (DSP), a field programmable gate array (FPGA), and the like.

When the control module 800 is used to implement the scheme according to the present disclosure, the processing unit 810 may be configured (for example, configured by the instructions 830 in the memory unit 820) to implement at least one method or step referenced in FIG. 5A, FIG. 5B, FIG. 6, and FIG. 7 mentioned above. All the features described above with reference to FIG. 5A, FIG. 5B, FIG. 6 and FIG. 7 are applicable to the control module 800 and will not be repeated here.

Those skilled in the art may understand that the method steps described herein are not merely limited to the order shown in the accompanying drawings, but rather maybe executed in any other feasible order.

In one or more exemplary designs, the functions described in the present disclosure may be implemented by hardware, software, firmware, or any combination thereof. For example, when implemented in software, the functions may be stored on a computer-readable medium as one or more instructions or codes, or may be transmitted as one or more instructions or codes on the computer-readable medium.

Each component of the interconnection device disclosed herein may be implemented using discrete hardware components, or may be integrated on one hardware component. For example, a general purpose processor, digital signal processor (DSP), application specific integrated circuit (ASIC), field programmable gate array (FPGA) or other programmable logic device, discrete gate or transistor logic, discrete hardware components or any combinations thereof to execute the functions described in the present disclosure, to implement or perform the various exemplary logical blocks, modules, and circuits in connection with the present disclosure.

Those skilled in the art should also understand that the various exemplary logic blocks, modules, circuits and algorithm steps described in conjunction with the embodiments of the present disclosure may be implemented as electronic hardware, computer software, or a combination of the two.

The above description of the present disclosure is provided to enable any person skilled in the art to make or use the present disclosure. Various modifications to the present disclosure will be readily apparent to those skilled in the art, and the generic principles defined herein may be applied to other modifications without departing from the spirit and scope of the present disclosure. Thus, the disclosure is not to be limited to the examples and designs described herein but is to be accorded the widest scope consistent with the principles and novel features disclosed herein.

What is claimed is:

1. A method for monitoring a distributed antenna system, the distributed antenna system including a near-end device, one or more relay devices connected to the near-end device, and one or more far-end devices connected to each relay device, the monitoring method comprising:

at a relay device, receiving a first operation monitoring signal sent by the near-end device through a first optical port of the near-end device, wherein the first operation monitoring signal carries an operation monitoring message, and the operation monitoring message includes a device address of a monitoring target device;

determining, by a second optical module of the relay device, to analyze the first operation monitoring signal according to a connection status with the near-end device;

in response to a determination by the second optical module of the relay device to analyze the first operation monitoring message signal, analyzing the first operation monitoring signal to confirm the monitoring target device;

in response to the monitoring target device corresponding to the second optical module of the replay device, determining to respond to the operation monitoring message; and in response to a determination by the second optical module of the relay device to respond to the operation monitoring message, responding to the operation monitoring message according to the monitoring target device as confirmed, comprising:

determining whether the monitoring device is the relay device or a far-end device associated with the relay device;

in response to determining that the monitoring target device is the relay device, obtaining operation information as requested by the operation monitoring message, as a response to the operation monitoring message in response to determining that the monitoring target device is the far-end device associated with the relay device, sending a second operation monitoring signal through a third optical port of the relay device, the second operation monitoring signal carrying the operation monitoring message.

2. The monitoring method according to claim 1, wherein the monitoring device is determined as the far-end device associated with the relay device, and the method further comprises, at the far-end device connected to the relay device:

determining, by a fourth optical module of the far-end device, to analyze the second operation monitoring signal respectively according to a connection status with the relay device;

in response to a determination by the fourth optical module of the far-end device to analyze the second operation monitoring signal, analyzing the second operation monitoring signal to determine to respond to the operation monitoring message; and in response to a determination by the fourth optical module of the far-end device determining to respond to the operation monitoring message, acquiring operation information requested by the operation monitoring message and sending the operation information back to the relay device.

3. The monitoring method according to claim 1, further comprising:

turning off, by the near-end device, optical switches of all the first optical ports of the near-end device;

turning on, by the near-end device, an optical switch of the first optical port corresponding to a first main link and a first backup link of a target relay device;

sending, by the near-end device, a first monitoring message through all the first optical ports of the near-end device, wherein the first monitoring message is used to obtain identification information of the target relay device;

determining, by the relay device receiving the first monitoring message, that an alarm status of a second optical module corresponding to the first main link of the relay device is normal;

in response to the relay device determines that the alarm state of the second optical module corresponding to the first main link is normal, turning off, by the relay device, optical switches of other second optical modules of the relay device and sending the identification information of the relay device to the near-end device through the first main link; and in response to receiving the identification information of the target relay device, sending, by the near-end device, a first address assignment message to the target relay device, wherein the first address assignment message includes a relay device address assigned by the near-end device to the target relay device, and the relay device address is unique between the near-end device and multiple relay devices.

4. The monitoring method according to claim 3, further comprising:

in response to the relay device determines that the alarm state of the second optical module corresponding to the first main link is abnormal, sending the identification information of the relay device to the near-end through the first backup link.

5. The monitoring method according to claim 3, wherein the first address assignment message further includes identification information of the target relay device, and the monitoring method further comprises:

after receiving the first address assignment message, comparing, by the target relay device, the identification information contained in the first address assignment message with identification information of the target relay device itself;

in response to the identification information contained in the first address assignment message is consistent with the identification information of the target relay device itself, setting the address of the relay device as the address of the target relay device; and returning address assignment success information to the near-end device through the first main link or the first backup link.

6. The monitoring method according to claim 3, further comprising:

turning off, by the relay device, optical switches of all the third optical ports of the relay device;

turning on, by the relay device, an optical switch of the third optical port corresponding to the second main link and the second backup link of a target far-end device;

sending, by the relay device, a second monitoring message through all the third optical ports of the relay device, wherein the second monitoring message is used to obtain identification information of the target far-end device;

determining, by the far-end device receiving the second monitoring message, that an alarm state of a fourth optical module corresponding to the second main link of the far-end device is normal;

in response to the far-end device determines that the alarm state of the fourth optical module corresponding to the second main link is normal, turning off optical switches of other fourth optical modules of the far-end device and sending the identification information of the far-end device to the relay device through the second main link; and in response to receiving the identification information of the target far-end device, sending, by the relay device, a second address assignment message to the target far-end device, wherein the second address assignment message includes a far-end device address assigned by the relay device to the target far-end device, wherein the far-end device address is unique between the relay device and multiple far-end devices connected to the relay device.

7. The monitoring method according to claim 6, further comprising:

in response to the far-end device determines that the alarm state of the fourth optical module corresponding to the second main link is abnormal, sending the identification information of the far-end device to the relay device through the second backup link.

8. The monitoring method according to claim 7, wherein sending the identification information of the far-end device to the relay device through the second backup link comprises:

in response to the far-end device determines that the alarm status of the fourth optical module corresponding to the second main link is abnormal, switching the far-end device from the second main link to the second backup link through an FSK switch; and sending the identification information of the far-end device to the relay device through the second backup link.

9. The monitoring method according to claim 6, wherein the second address assignment message further includes identification information of the target far-end device, and the monitoring method further comprises:

after receiving the second address assignment message, comparing, by the target far-end device, the identification information contained in the second address assignment message with the identification information of the target far-end device itself;

in response to the identification information contained in the second address assignment message is consistent with the identification information of the target far-end device itself, setting the address of the far-end device as the address of the target far-end device; and returning address assignment success information to the relay device through the second main link or the second backup link.

10. The monitoring method according to claim 6, further comprising:

after the near-end device assigns addresses to the optical ports, turning on all optical switches to update a topology map of the distributed antenna system.

11. The monitoring method according to claim 1, wherein the near-end device and the relay device communicate using a first carrier frequency, and the relay device and the far-end device communicate using a second carrier frequency different than the first carrier frequency.

12. The monitoring method according to claim 1, further comprising:

in response to a second monitoring target device identified in a second operation monitoring message not corresponding to the second optical module of the replay device, determining not to respond to the second operation monitoring message.

13. The method according to claim 1, wherein the connection status with the near-end device is a normal status or an abnormal status; and the second optical module determines to analyze the first operation monitoring signal in response to the connection status with the near-end device being the normal status.

14. The method according to claim 1, wherein:

the connection status with the near-end device is determined as the normal status in response to an optical receiving alarm at the second optical module is normal and an optical receiving power at the second optical module is not lower than a threshold.

15. A control module in a distributed antenna system, the distributed antenna system including a near-end device, one or more relay devices connected to the near-end device, and one or more far-end devices connected to each relay device, the control module comprising:

at least one processor; and at least one memory coupled to the at least one processor and storing instructions for execution by the at least one processor that, when executed by the at least one processor, cause the at least one processor to perform:

receiving a first operation monitoring signal sent by the near-end device through a first optical port of the near-end device, wherein the first operation monitoring signal carries an operation monitoring message, and the operation monitoring message includes a device address of a monitoring target device;

determining, by a second optical module of the relay device, to analyze the first operation monitoring signal according to a connection status with the near-end device;

in response to a determination by the second optical module of the relay device to analyze the first operation monitoring message signal, analyzing the first operation monitoring signal to confirm the monitoring target device;

in response to the monitoring target device corresponding to the second optical module of the replay device, determining to respond to the operation monitoring message; and in response to a determination by the second optical module of the relay device to respond to the operation monitoring message, responding to the operation monitoring message according to the monitoring target device as confirmed, comprising:

determining whether the monitoring device is the relay device or a far-end device associated with the relay device;

in response to determining that the monitoring target device is the relay device, obtaining operation information as requested by the operation monitoring message, as a response to the operation monitoring message in response to determining that the monitoring target device is the far-end device associated with the relay device, sending a second operation monitoring signal through a third optical port of the relay device, the second operation monitoring signal carrying the operation monitoring message.

16. A non-transitory computer-readable storage medium on which computer program code is stored, and the computer program code, when executed by a processor in a distributed antenna system, cause the processor to perform:

at a relay device, receiving a first operation monitoring signal sent by a near-end device through a first optical port of the near-end device, wherein the first operation monitoring signal carries an operation monitoring message, and the operation monitoring message includes a device address of a monitoring target device, wherein the distributed antenna system includes the near-end device, one or more relay devices connected to the near-end device, and one or more far-end devices connected to each relay device;

determining, by a second optical module of the relay device, to analyze the first operation monitoring signal according to a connection status with the near-end device;

in response to a determination by the second optical module of the relay device to analyze the first operation monitoring message signal, analyzing the first operation monitoring signal to confirm the monitoring target device;

in response to the monitoring target device corresponding to the second optical module of the replay device, determining to respond to the operation monitoring message; and in response to a determination by the second optical module of the relay device to respond to the operation monitoring message, responding to the operation monitoring message according to the monitoring target device as confirmed, comprising:

determining whether the monitoring device is the relay device or a far-end device associated with the relay device;

in response to determining that the monitoring target device is the relay device, obtaining operation information as requested by the operation monitoring message, as a response to the operation monitoring message in response to determining that the monitoring target device is the far-end device associated with the relay device, sending a second operation monitoring signal through a third optical port of the relay device, the second operation monitoring signal carrying the operation monitoring message.

* * * * *